United States Patent

Carlson et al.

[11] Patent Number: 5,931,218
[45] Date of Patent: Aug. 3, 1999

[54] APPARATUS AND METHOD FOR COOLING AN AXLE ASSEMBLY

[75] Inventors: Robert D. Carlson, Plainfield; Michael G. Seil, Naperville; Robert A. Stinson, Aurora, all of Ill.

[73] Assignee: Caterpillar Inc., Peoria, Ill.

[21] Appl. No.: 09/053,269

[22] Filed: Apr. 1, 1998

Related U.S. Application Data

[63] Continuation of application No. 08/769,919, Dec. 19, 1996, abandoned.

[51] Int. Cl.$^6$ .............................. F01M 9/00; F01M 5/00; F16H 57/04; B60K 17/16
[52] U.S. Cl. ...................... 165/47; 184/104.1; 184/104.3; 184/6.12; 184/6.22; 74/606 A; 74/467
[58] Field of Search ............................. 165/47; 74/606 A, 74/467; 184/104.1, 104.3, 6.12, 6.22

[56] References Cited

U.S. PATENT DOCUMENTS

| | | | |
|---|---|---|---|
| 1,992,568 | 2/1935 | Connor | 290/2 |
| 4,198,819 | 4/1980 | Bourne | 60/337 |
| 4,633,938 | 1/1987 | Schunck et al. | 165/47 |

FOREIGN PATENT DOCUMENTS

| | | |
|---|---|---|
| 0623767A1 | 11/1994 | European Pat. Off. . |
| 1406298 | 9/1975 | United Kingdom . |

OTHER PUBLICATIONS

Patent Abstracts of Japan, vol. 12, No. 445, M–767 abstract of JP 63–176872 A (Toyota Motor Corp.), Jul. 21, 1988.
Patent Abstracts of Japan, vol. 4, No. 167, M–42 abstract of JP 55–1156565 A (Yamah Hatsudoki K.K.), Sep. 5, 1980.

*Primary Examiner*—John K. Ford
*Attorney, Agent, or Firm*—William C. Perry; David M. Masterson

[57] ABSTRACT

An apparatus for cooling an axle assembly includes a housing defining a chamber having a first fluid contained therein. The apparatus also includes a conduit located within the chamber. The apparatus further includes a fluid source in fluid communication with the conduit, wherein (1) a second fluid located within the fluid source is advanced through the conduit, and (2) the first fluid located within the housing does not intermix with the second fluid being advanced through the conduit. A method of cooling a differential assembly is also disclosed.

9 Claims, 6 Drawing Sheets

APPARATUS AND METHOD FOR COOLING AN AXLE ASSEMBLY

This is a continuation application of application Ser. No. 08/769,919, filed Dec. 19, 1996 now abandoned.

BACKGROUND OF THE INVENTION

The present invention relates generally to an axle assembly, and more particularly to an apparatus and method for cooling an axle assembly.

Earth working vehicles, such as front end loaders and the like, typically include a frame attached to a body portion. An axle assembly is generally secured to the frame. The axle assembly includes a housing having chamber defined therein. The housing includes a left end and a right end. The left end of the housing is attached to a left axle housing. The right end of the housing is attached to a right axle housing. A left rim mount is secured to the left axle housing such that the left axle housing is interposed between the housing and the left rim mount. A right rim mount is secured to the right axle housing such that the right axle housing is interposed between the housing and the right rim mount. Tires are secured on the left and right rim mounts such that the vehicle can roll over the ground.

The axle assembly includes a differential assembly which is located within the chamber of the housing. The axle assembly also includes a braking assembly located within the chamber of the housing. The differential assembly is mechanically coupled to an engine via a drive shaft. The differential assembly is also mechanically coupled to the left and right rim mounts such that torque generated by the engine is transmitted to the left and right rim mounts via the drive shaft and the differential assembly. Such transmission of torque causes the left and right rim mounts, and therefore the tires, to rotate and propel the vehicle over the ground to perform various work functions.

During use of the vehicle, friction between various components of the axle assembly cause the differential assembly and the braking assembly to heat up beyond an acceptable limit. This heating can damage the axle assembly and thus reduce its useful life. Therefore a fluid, such as oil, is contained within the chamber in contact with the differential assembly and the braking assembly. This fluid cools the differential assembly and the braking assembly. However, during prolonged use of the vehicle, the fluid in the chamber can also heat up beyond an acceptable limit. Thus, the fluid must be cooled to function effectively and prolong the life of the axle assembly.

One way of cooling the fluid (i.e. the oil) is to circulate it through a heat exchange element located outside of the chamber. However, this approach requires the fluid which is contained in the axle assembly to be pumped to a location outside of the housing. In cold weather the viscosity of oil can significantly increase. Therefore, in cold weather, pumping the fluid to a location outside of the housing is difficult.

It would therefore be desirable to provide an apparatus for cooling components of an axle assembly that does not need to pump the fluid which contacts the differential assembly to a location outside the housing.

SUMMARY OF THE INVENTION

In accordance with one embodiment of the present invention there is provided an apparatus for cooling an axle assembly. The apparatus includes a housing defining a chamber having a first fluid contained therein. The apparatus also includes a conduit located within the chamber. The apparatus also includes a fluid source in fluid communication with the conduit, wherein (1) a second fluid propelled by the fluid source is advanced through the conduit, and (2) the first fluid located within the housing does not intermix with the second fluid which is being advanced through the conduit.

In accordance with another embodiment of the present invention there is provided an apparatus for cooling an axle assembly. The apparatus includes a housing defining a chamber having a first fluid contained therein. The apparatus also includes a plurality of cooling tubes located within the chamber. The apparatus also includes a fluid source in fluid communication with the plurality of cooling tubes, wherein (1) a second fluid propelled by the fluid source is advanced through the plurality of cooling tubes, and (2) the first fluid located within the housing does not intermix with the second fluid which is being advanced through the plurality of cooling tubes.

In accordance with yet another embodiment of the present invention there is provided a method of cooling an axle assembly. The method includes the steps of (1) providing a housing defining a chamber having a first fluid contained therein, wherein the first fluid forms a fluid pool within the chamber, (2) positioning a plurality of cooling tubes within the fluid pool, and (3) advancing a second fluid through the cooling tubes, wherein the first fluid located within the housing does not intermix with the second fluid which is being advanced through the cooling tubes.

It is therefore an object of this invention to provide a new and useful apparatus for cooling an axle assembly.

It is also an object of this invention to provide an improved apparatus for cooling an axle assembly.

It is another object of this invention to provide a new and useful method of cooling an axle assembly.

It is another object of this invention to provide an improved method of cooling an axle assembly.

It is still another object of this invention to provide an apparatus for cooling an axle assembly that does not require a fluid which contacts the differential assembly to be pumped out of the housing in which the differential is contained.

The above and other objects, features, and advantages of the present invention will become apparent from the following description and the attached drawings.

DETAILED DESCRIPTION OF THE PREFERRED EMBODIMENT

Figure 1:
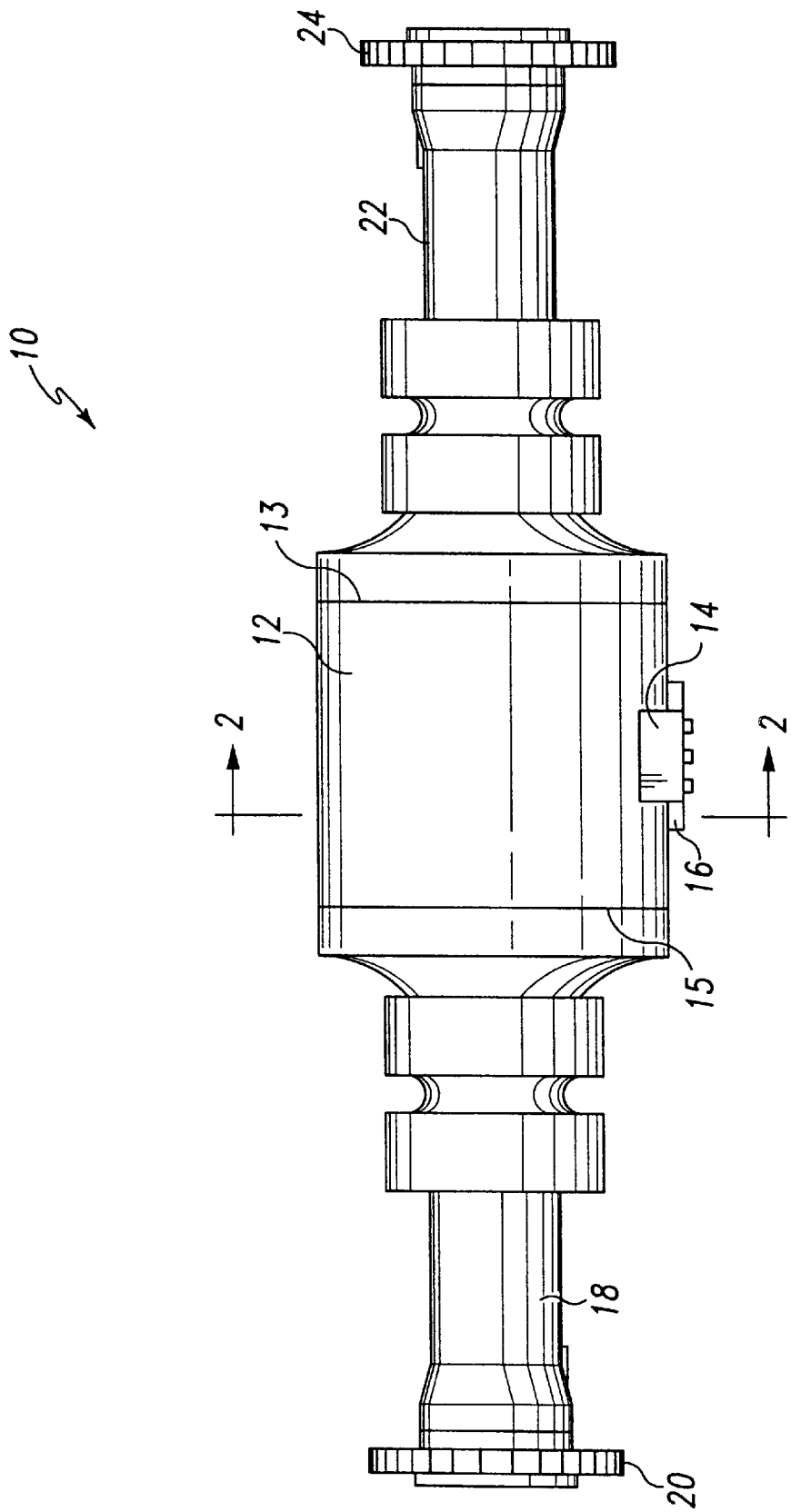
FIG. 1 is an elevational view of an axle assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring to FIG. 1, there is shown an axle assembly 10 of a vehicle (not shown) which incorporates the features of the present invention therein. The axle assembly 10 includes a housing 12, a left axle housing 18 and a right axle housing 22. The axle assembly 10 also includes a left rim mount 20 and a right rim mount 24.

Housing 12 includes a hood portion 14, a flange 16, a first end 13 and a second end 15. An end of right axle housing 22 is secured to first end 13 of housing 12. Right rim mount 24 is secured to right axle housing 22 such that right axle housing 22 is interposed between right rim mount 24 and housing 12. An end of left axle housing 18 is secured to second end 15 of housing 12. Left rim mount 20 is secured to left axle housing 18 such that left axle housing 18 is interposed between left rim mount 20 and housing 12.

Figure 2:
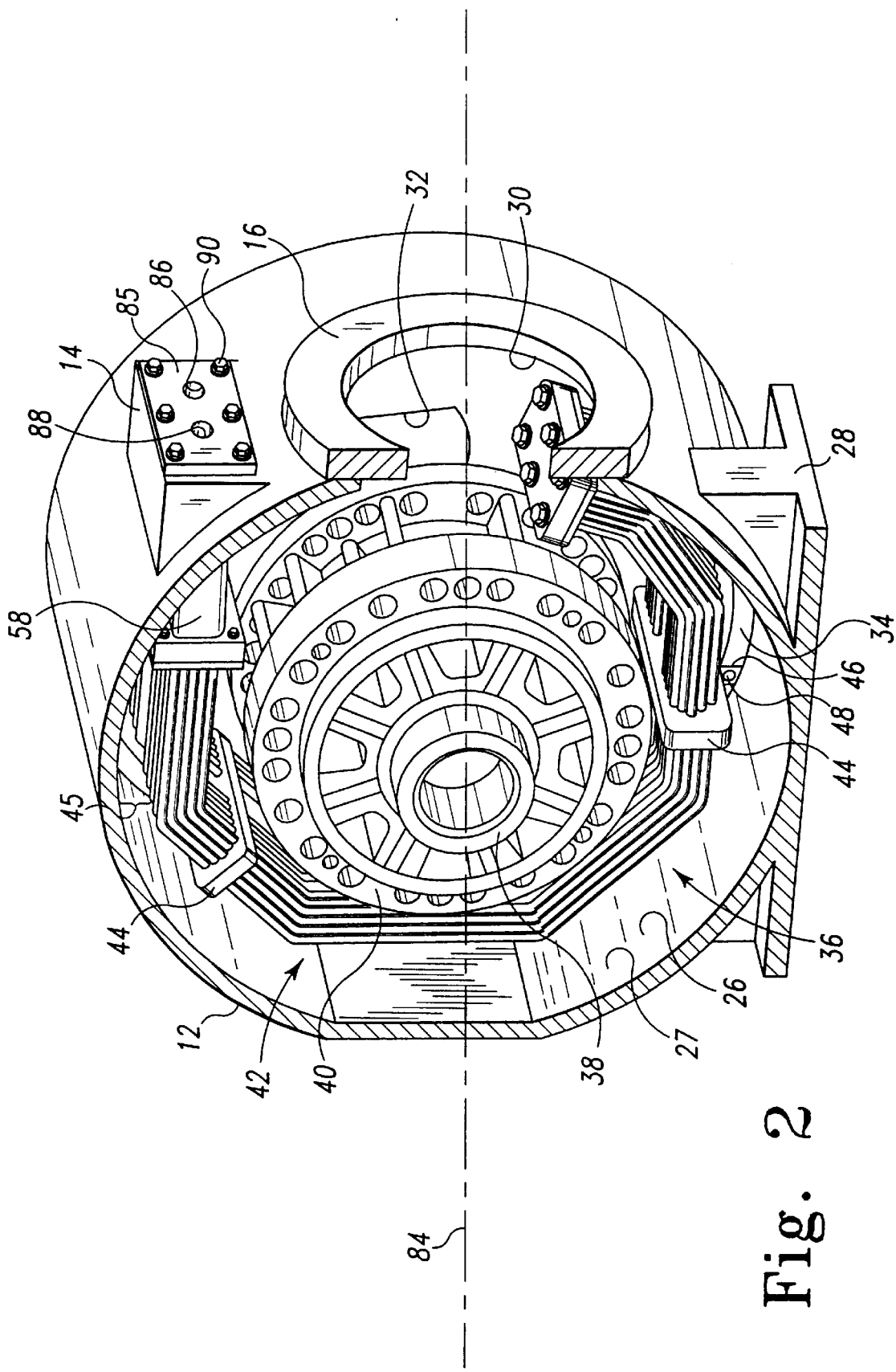
FIG. 2 is an enlarged cross sectional view of the axle assembly taken along line 2—2 of FIG. 1, with the right axle housing removed for clarity of description.

As shown in FIG. 2, housing 12 also includes a mounting member 28 attached thereto. Housing 12 also includes a drive shaft opening 30 and a first axle opening 32 defined therein. It should be understood that housing 12 has a second axle opening defined therein which is not shown in FIG. 2. Housing 12 further includes a chamber 26 defined therein. The housing 12 defines an interior wall 27 having a shoulder 34 formed thereon. Housing 12 also has attached thereto a port plate 85. Port plate 85 is secured to hood portion 14 with bolts 90. Port plate 85 has an inflow opening 86 and an outflow opening 88 defined therein.

A differential assembly 36 is mounted within chamber 26 of housing 12 in a well known manner. Differential assembly 36 includes an axle mount 38 and a drive gear mount 40. Axle mount 38 is coaxially positioned relative to drive gear mount 40. Note that a drive gear which is securable to drive gear mount 40 has been removed from FIG. 2 for clarity of description.

A first fluid is contained in the reservoir formed by the interior of the axle assembly 10 so as to form a pool therein. The pool in chamber 26 has a surface that is represented by line 84. Thus it should be understood that a portion of differential assembly 36 is submerged in the pool. It should also be understood that portions of braking assemblies (not shown) contained in chamber 27 are submerged in the pool.

Figure 3:
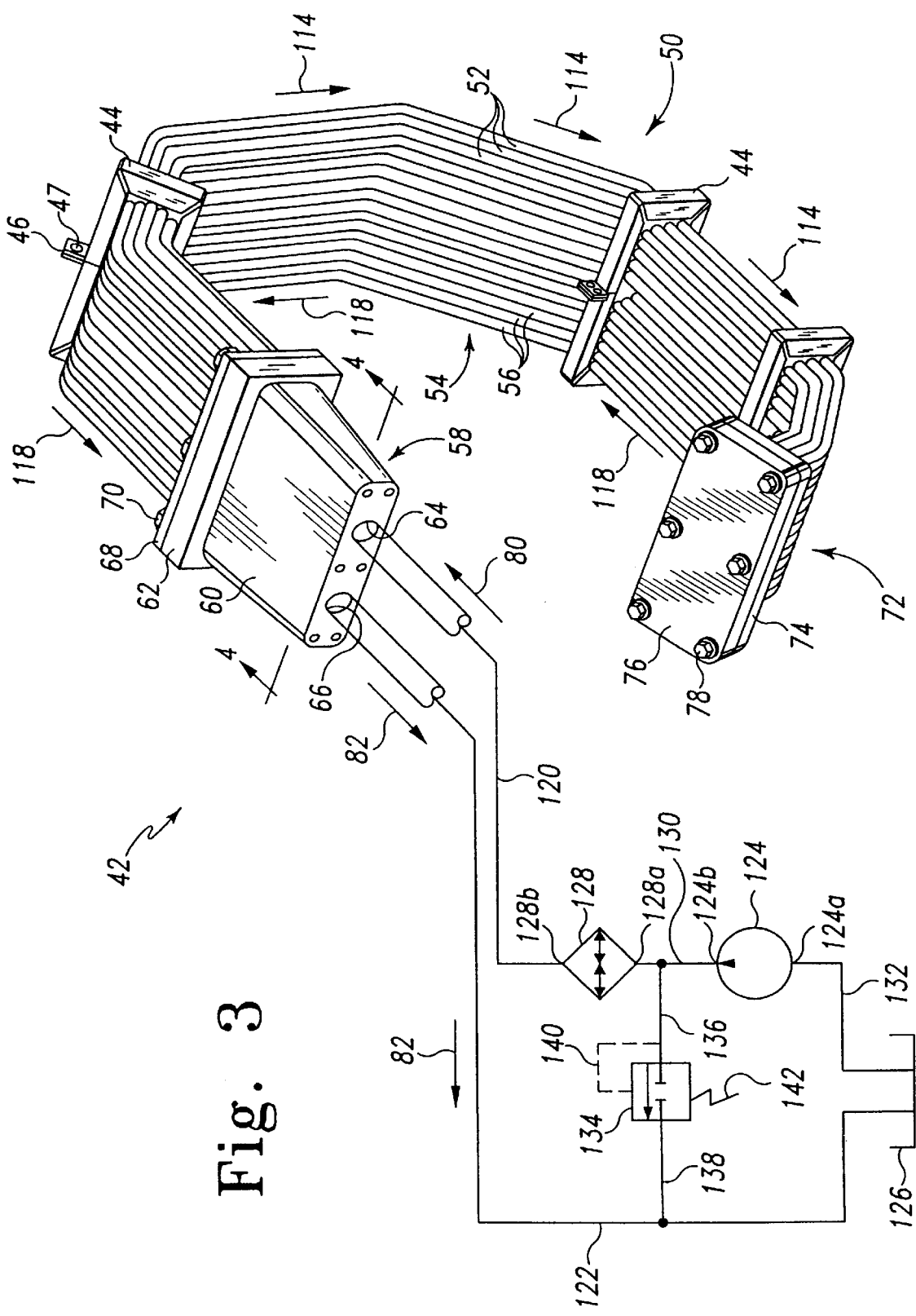
FIG. 3 is a perspective view of the conduit assembly of FIG. 2, schematically shown in fluid communication with a fluid source.

Chamber 26 has a conduit assembly 42 positioned therein. As shown in FIG. 3, conduit assembly 42 includes an inflow conduit 50, an outflow conduit 54, a coupler 58 and an exchange container 72. Inflow conduit 50 includes a plurality of inflow tubes 52. Outflow conduit 54 includes a plurality of outflow tubes 56.

Figure 4:
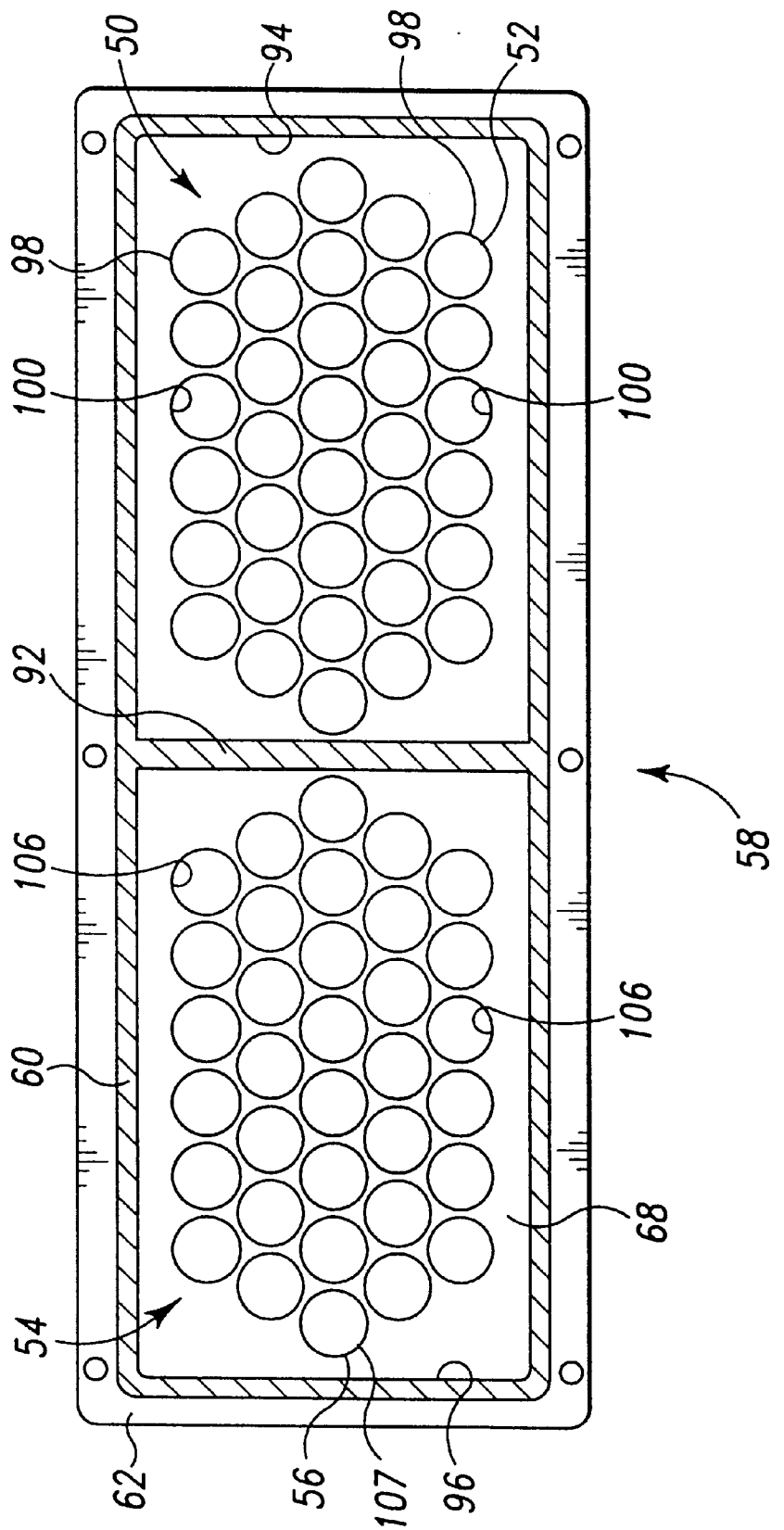
FIG. 4 is an enlarged cross sectional view of the coupler taken along line 4—4 of FIG. 3.
Figure 5:
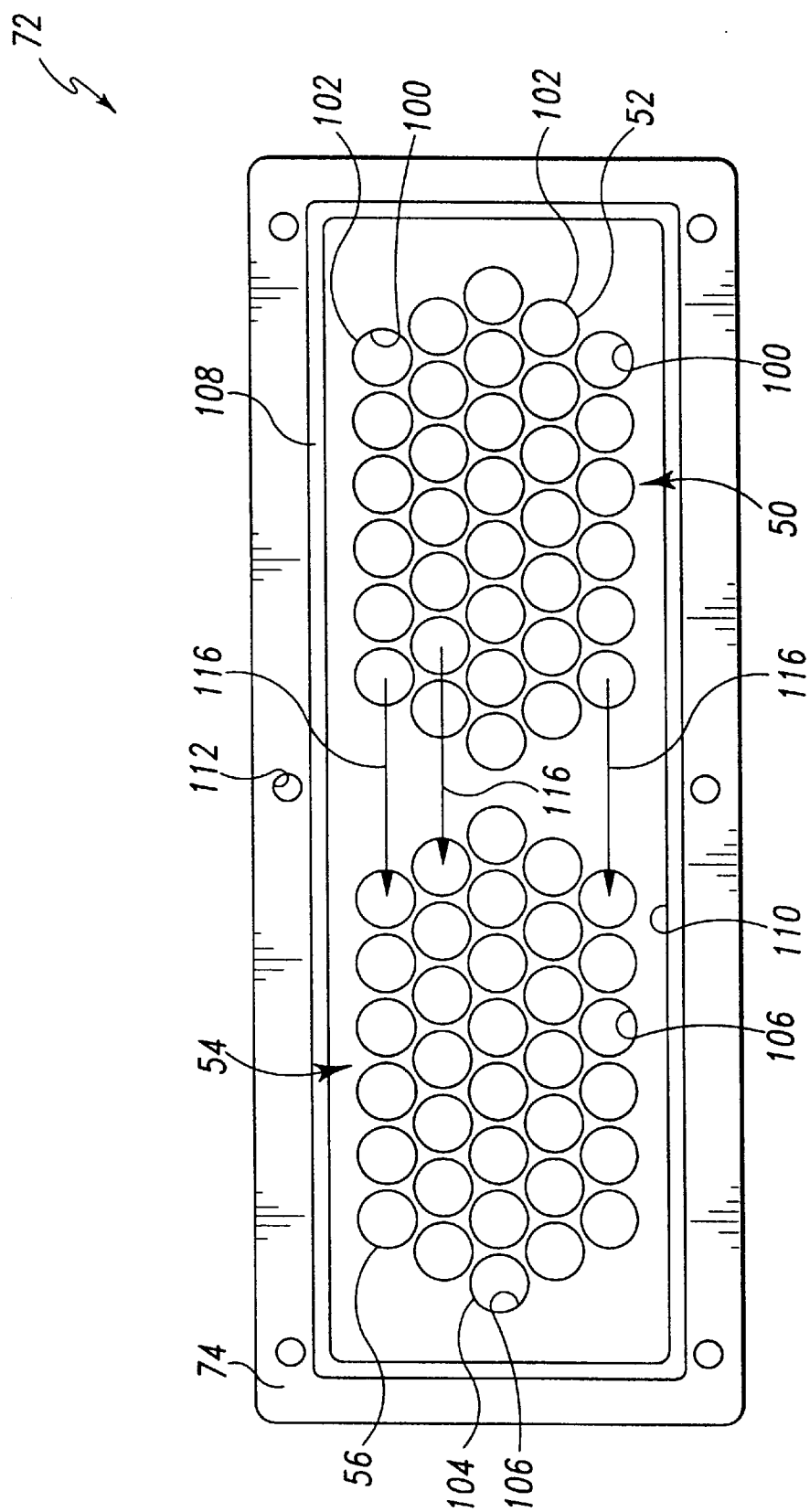
FIG. 5 is an enlarged elevational view of the exchange container shown in FIG. 3, with the cover plate removed for clarity of description.

As shown in FIGS. 4 and 5, each inflow tube 52 has an end 98 and an end 102. Each inflow tube 52 also has a first passageway 100 defined between end 98 and end 102. Each outflow tube 56 has an end 104 and an end 107. Each outflow tube 56 has a second passageway 106 defined between end 104 and end 107.

As shown in FIGS. 3 and 4, coupler 58 has an enclosure 60, a frame 62 and a plate 68. Enclosure 60 has an inflow aperture 64 and an outflow aperture 66 defined therein. Enclosure 60 is secured to frame 62. Frame 62 is attached to plate 68 with bolts 70. Enclosure 60 also includes a partition member 92 that separates enclosure 60 into a fluid tight first receptacle 94 and a fluid tight second receptacle 96. The partition 92 is positioned such that inflow aperture 64 opens into receptacle 94 and outflow aperture 66 opens into receptacle 96.

As shown in FIGS. 3 and 5, exchange container 72 includes a base plate 74, a cover plate 76 and a wall 108. Cover plate 76 is secured to base plate 74 by screwing bolts 78 through cover plate 76 and into bolt holes 112 formed in base plate 74. Securing cover plate 76 to base plate 74 in the above described fashion forms a fluid tight cavity 110 within exchange container 72.

Referring back to FIG. 4, end 98 of each inflow tube 52 is secured to plate 68 such that each first end 98 of each first passageway 100 opens into first receptacle 94. In addition, fourth end 107 of each outflow tube 56 is secured to plate 68 such that each fourth end 107 of each second passageway 106 opens into second receptacle 96.

Referring back to FIG. 5, second end 102 of each inflow tube 52 is secured to base plate 74 such that each second end 102 of each first passageway 100 opens into cavity 110. In a similar fashion, third end 104 of each outflow tube 56 is secured to base plate 74 such that each third end 104 of each second passageway 106 opens into cavity 110.

Figure 6:
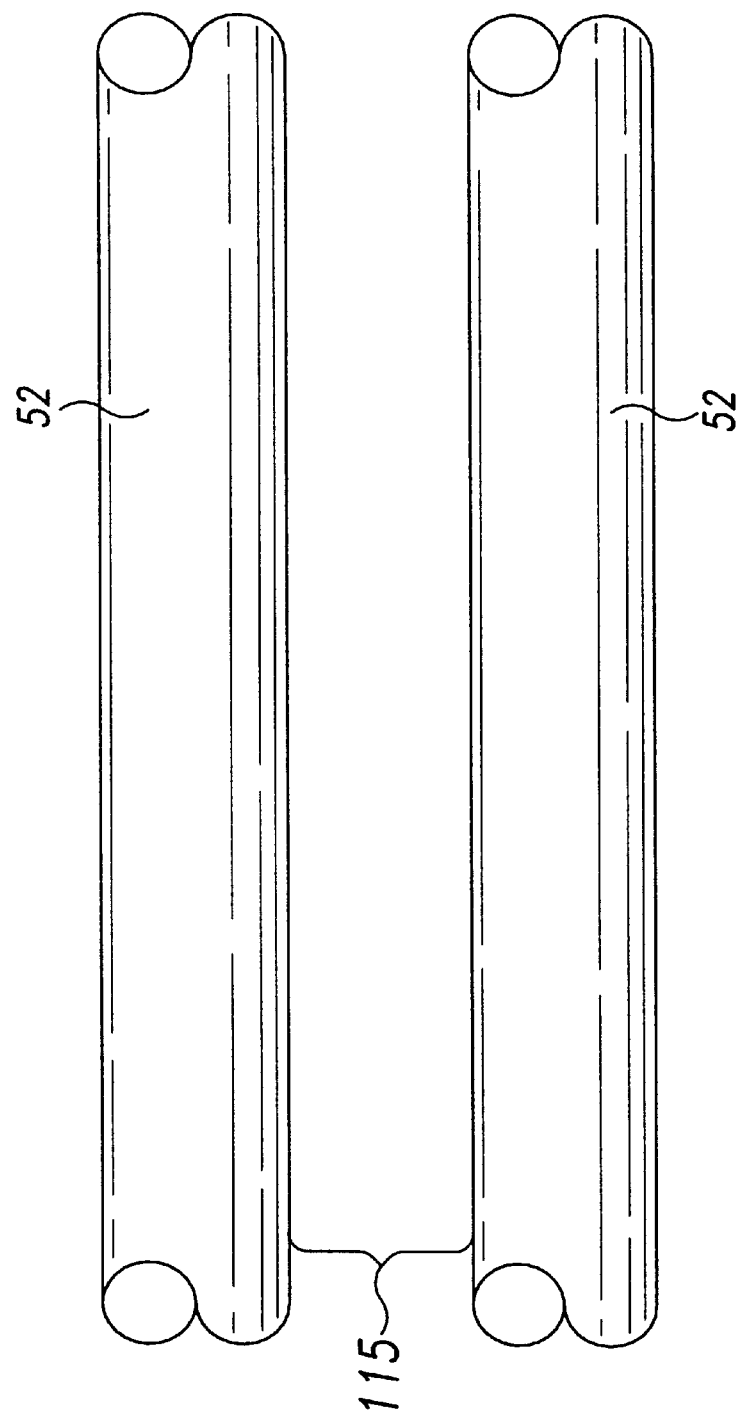
FIG. 6 is an enlarged fragmentary elevational view of two adjacent inflow tubes shown in FIG. 3.

Conduit assembly 42 further includes a number of brackets 44 having a securement member 46 as shown in FIGS. 2 and 3. Securement member 46 has a bolt hole 47 formed therein. Brackets 44 surround and support inflow tubes 52 and outflow tubes 56 of conduit assembly 42. As shown in FIG. 6, inflow tubes 52 are supported by brackets 44 such that a space 115 is defined between adjacent inflow tubes 52. It should be understood that brackets 44 support outflow tubes 56 such that a space (not shown) similar to space 115 is defined between adjacent outflow tubes 56. Space 115 and the space between adjacent outflow tubes 56 are occupied by the first fluid which is contained within the housing 12 of the axle assembly 10. Having space 115 and the space between adjacent outflow tubes 56 occupied by the first fluid facilitates heat transfer between the first fluid and inflow tubes 52 and outflow tubes 56.

As shown in FIG. 2, conduit assembly 42 and brackets 44 are positioned within chamber 26 such that bolt hole 47 formed in each securement member 46 aligns with a bolt hole (not shown) formed in shoulder 34. A bolt 48 is positioned in bolt hole 47 and screwed into the bolt hole formed in shoulder 34, thus mounting conduit assembly 42 in chamber 26. It should be understood that conduit assembly 42 is mounted in chamber 26 such that it partially surrounds differential assembly 36, and is partially submerged in the first fluid pool. Conduit assembly 42 is also mounted in chamber 26 such that a space 45 is defined between inner wall 27 and conduit assembly 42. Conduit assembly 42 is further mounted in chamber 26 such that inflow aperture 64 (see FIG. 3) is aligned with inflow opening 86 of hood plate 85. Conduit assembly 42 is also mounted in chamber 26 such that outflow aperture 66 (see FIG. 3) is aligned with outflow opening 88 of hood plate 85.

As schematically shown in FIG. 3, conduit assembly 42 is in fluid communication with a fluid source or fluid pump 124. In particular, an inlet port 124a of the fluid pump 124 is coupled to a reservoir 126 via a fluid line 132, whereas an outlet port 124b of the fluid pump 124 is coupled to an inlet port 128a of a heat exchanger 128 via a fluid line 130. An outlet port 128b of the heat exchanger 128 is coupled to the inflow aperture 64 via a fluid inflow line 120. The heat exchanger 128 removes heat from the second fluid, such as hydraulic oil, as the second fluid advances therethrough. Hence, the second fluid is cooled prior to being advanced in the general direction of arrow 80 to the inflow aperture 64.

The outlet aperture 66 is coupled to the reservoir 126 via a drain line 122. Hence, exhausted or spent fluid may be advanced from conduit assembly 42 to reservoir 126 and hence the fluid pump 124 for subsequent use thereof.

A pressure relief, or unloading valve 134 is in fluid communication with the conduit assembly 42. In particular, an inlet of the pressure relief valve 134 is coupled to the fluid line 130 via a fluid line 136, whereas an outlet of the pressure relief valve 134 is coupled to the drain line 122 via a drain line 138. The pressure relief valve 134 includes a fluid pressure sensing line 140 and a spring 142. If a fluid pressure of a predetermined magnitude is exerted on the pressure sensing line 140, the bias of the spring 142 is overcome thereby urging the pressure relief valve 134 downwardly (as viewed in relation to the schematic of FIG. 3). When the pressure relief valve 134 is urged downwardly, a portion of the fluid advancing from the fluid pump 124 is advanced to the reservoir 126 thereby reducing the fluid pressure in the fluid line 130. Hence a fluid pressure of a predetermined magnitude is maintained in the fluid line 130, the heat exchanger 128, the inflow line 120, and the conduit assembly 42.

Preferably, fluid pump 124 is a pump that is already present on the vehicle. For example, a hydraulic pump used in a hydraulic steering system or a hydraulic brake system. Such a hydraulic system can be easily modified so that the hydraulic system can be connected to the fluid line 130. Utilizing a fluid pump 124 which is already present on the vehicle is beneficial since the number of fluid pumps used by the vehicle should be kept to as small a number as possible.

An end of inflow line 120, opposite to the end connected to the heat exchanger 128, is connected to coupler 58 such that inflow line 120 is in fluid communication with inflow aperture 64. An end of the drain line 122, opposite to the end connected to the reservoir 126, is connected to the coupler 58 such that drain line 122 is in fluid communication with outflow aperture 66. The above described arrangement places the fluid pump 124 and the reservoir 126 in fluid communication with the conduit assembly 42.

The second fluid is propelled through fluid inflow line 120 by fluid pump 124 in the direction indicated by arrow 80. The second fluid enters first receptacle 94 (see FIG. 4) of coupler 58 through inflow opening 86 (see FIG. 2) and inflow aperture 64. The second fluid is advanced through inflow conduit 50 via first passageways 100 of inflow tubes 52 in the direction indicated by arrows 114. The second fluid then exits passageways 100 and enters cavity 110 (see FIG. 5) of exchange container 72 (see FIG. 5). Once in cavity 110 the second fluid enters outflow conduit 54 via second passageways 106 of outflow tubes 56 as indicated by arrows 116 of FIG. 5. The second fluid is then advanced through outflow conduit 54 in the direction of arrows 118. The second fluid then exits passageways 106 and enters second receptacle 96 (see FIG. 4) of coupler 58. The second fluid exits receptacle 96, via outflow aperture 66 and outflow opening 88 (see FIG. 2), and is advanced through outflow pipe 122 in the direction of arrow 82 back to reservoir 126. The second fluid is then recirculated through conduit assembly 42 by fluid pump 124 in the above described manner. It should be understood that the first fluid does not intermix with the second fluid at any time.

It should be appreciated that as the second fluid is advanced through conduit assembly 42, heat is transferred from the first fluid to the second fluid through conduit assembly 42. Therefore, the first fluid, the differential assembly 36, and the brake assembly is cooled. Once the second fluid exits chamber 26 of housing 12, heat transferred from the first fluid to the second fluid is transferred from the second fluid to the surrounding environment by heat exchanger 128. Therefore, the second fluid is cooled. Therefore, when the second fluid is recirculated through conduit assembly 42, it is cool relative to the first fluid, and the first fluid is continuously cooled by the circulating second fluid. Thus, the axle assembly 10 is continuously cooled by the circulating second fluid.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, first passageway 100 and second passageway 106 can contain a mechanism having a helically shaped wire to increase the turbulence of the flow of the second fluid through first passageway 100 and second passageway 106. This mechanism functions to improve the rate of heat transfer into the second fluid as is well known in the art.

In addition, while the second fluid is shown being cooled by the heat exchange upon exiting the fluid source 124, it should be understood that the second fluid may alternatively be cooled by the heat exchanger after exiting the conduit assembly 42 and prior to entering the reservoir 126.

Moreover, while the fluid flow has been described as being propelled in a certain direction through the inflow tubes 52 and the outflow tubes 56, it should be understood that the direction of fluid flow through the inflow tubes 52 and outflow tubes 56 may be reversed.

What is claimed is:

1. An apparatus for cooling an axle assembly, comprising:
   a housing defining a chamber having a first fluid contained therein;
   a differential assembly positioned in said chamber;
   a plurality of cooling tubes located within said chamber and being positioned about a majority of the differential assembly between said differential assembly and the housing;
   a fluid source in fluid communication with said plurality of cooling tubes, wherein (1) a second fluid propelled by said fluid source is advanced through said plurality of cooling tubes, and (2) said first fluid located within said housing does not intermix with said second fluid which is being advanced through said plurality of cooling tubes; and
      wherein said plurality of cooling tubes includes a plurality of inflow tubes each independently receiving said second fluid from said fluid source and a plurality of outflow tubes separate from said inflow tubes each exiting said second fluid from said housing.

2. The apparatus of claim 1 wherein:
   said first fluid forms a fluid pool within said chamber, and
   said plurality of cooling tubes are secured together in a generally C-shaped configuration and a lower portion thereof is positioned within the fluid pool.

3. The apparatus of claim 1, wherein
   said plurality of cooling tubes further include a coupler, and
   said coupler is in fluid communication with said plurality of inflow tubes and said plurality of outflow tubes.

4. The apparatus of claim 3, wherein:

said housing includes an inflow opening and an outflow opening, said coupler includes an inflow aperture and an outflow aperture, said inflow aperture of said coupler is in fluid communication with said inflow opening of said housing, and said outflow aperture of said coupler is in fluid communication with said outflow opening of said housing.

5. The apparatus of claim 1, wherein a first inflow tube and a second inflow tube of said plurality of inflow tubes define a first space therebetween which is occupied by said first fluid, and a first outflow tube and a second outflow tube of said plurality of outflow tubes define a second space therebetween which is occupied by said first fluid.

6. The apparatus of claim 1, wherein said fluid source is positioned outside of said chamber.

7. The apparatus of claim 1, wherein said first fluid includes oil, and said second fluid includes oil.

8. The apparatus of claim 1, wherein:

a space is defined between said cooling tubes and an interior wall of said housing.

9. A method of cooling an axle assembly, comprising the steps of:

providing a housing defining a chamber having a first fluid contained therein, wherein said first fluid forms a fluid pool within said chamber;

positioning a differential assembly within said chamber;

positioning a plurality of cooling tubes within said housing at a location about a majority of the periphery of the differential assembly interposed between the differential assembly and the housing within said fluid pool;

wherein said plurality of cooling tubes includes a plurality of inflow tubes for receiving a second fluid and a plurality of outflow tubes for exiting said second fluid; and advancing said second fluid simultaneously into each of said inflow tubes, through said inflow and outflow tubes, and expelling said second fluid from said outflow tubes wherein said first fluid located within said housing does not intermix with said second fluid which is being advanced through said cooling tubes.

* * * * *